P. Sylla,
Harvester Rake.

No. 38,515. Patented May 12, 1863.

Witnesses.
P. E. Wilson
E. Evans Jr.

Philo Sylla.
By atty A. B. Stoughton.

UNITED STATES PATENT OFFICE.

PHILO SYLLA, OF ELGIN, ILLINOIS.

IMPROVEMENT IN RAKES FOR HARVESTERS.

Specification forming part of Letters Patent No. 38,515, dated May 12, 1863.

*To all whom it may concern:*

Be it known that I, PHILO SYLLA, of Elgin, in the county of Kane and State of Illinois, have invented certain new and useful Improvements in Self-Acting Rakes for Harvesting-Machines; and I do hereby declare the following to be a full, clear, and exact description of the construction and operation of the same, reference being had to the accompanying drawings, making a part of this specification, in which—

Figure 1:
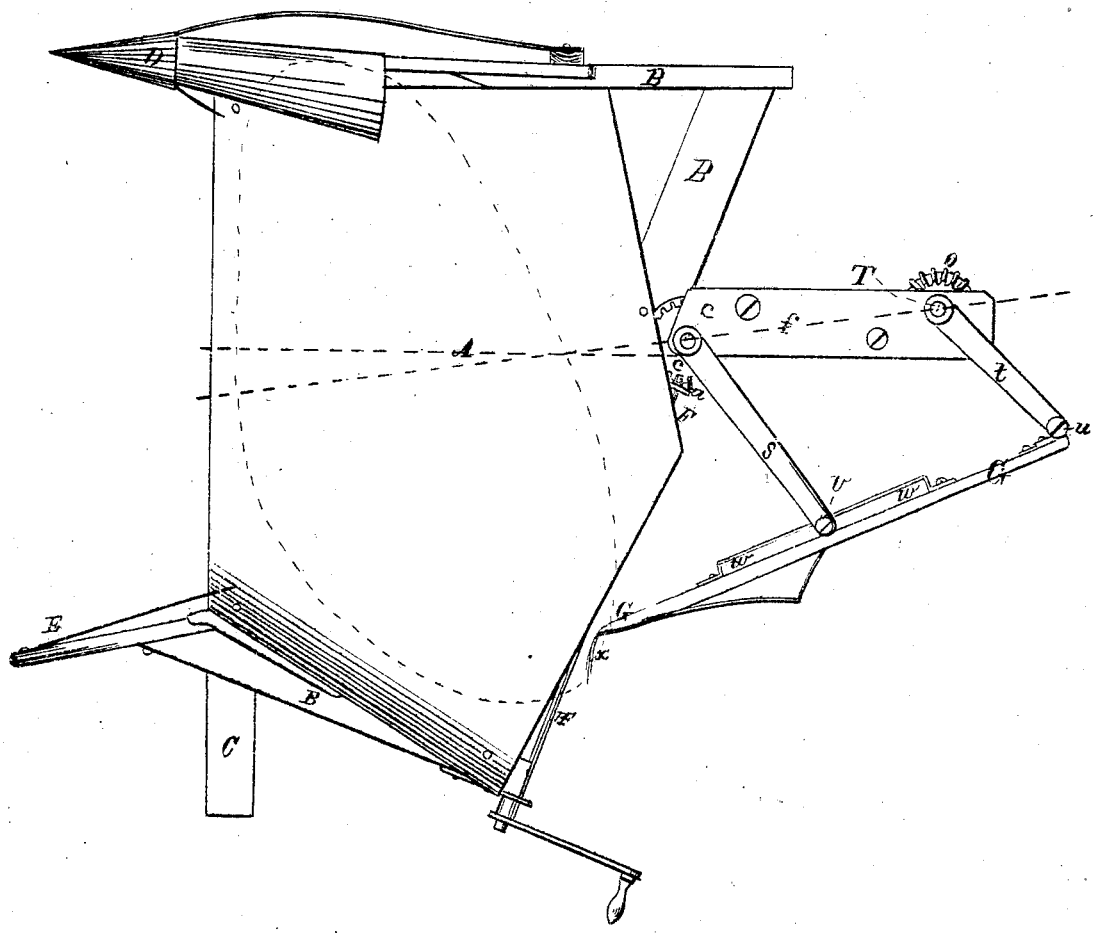
Figure 2:
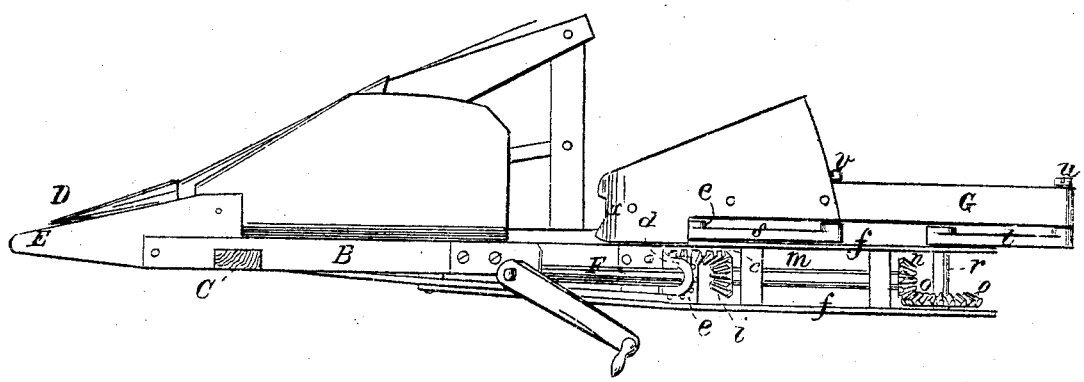

Figure 1 represents a top plan of a platform or grain-table for a harvesting-machine, with a rake and the mechanism for operating it connected thereto. Fig. 2 represents an elevation of the same in section.

Similar letters of reference, where they occur in the separate figures, denote like parts in both.

My invention consists in certain means for giving an automatic rake an elliptical sweep over the platform of a grain or grass harvester, the long diameter of the elliptical circuit being in a line drawn from the rear inside corner of the platform to the front outside corner thereof, so as to deliver the grain in gavels at a point clear of the return-swath of the machine.

To enable others skilled in the art to make and use my invention, I will proceed to describe the same with reference to the drawings.

A represents a platform or grain-table for receiving the grain as it is cut, B being the platform-frame, C the finger-bar, D the outside and E the inside shoe or divider. F is a shaft at the rear under side of the platform, which is driven from any of the moving parts of the machine, and has upon its outer end a beveled pinion, $a$, that gears with and turns a bevel-gear, $c$, on a vertical short shaft, $e$, supported in the bearing-plates $f\ f$. The bevel-gear $c$ works in and turns a bevel-pinion, $i$, on a horizontal shaft, $m$, extending rearward of the platform, the extreme rear end of said shaft $m$ having upon it a bevel-pinion, $n$, that meshes with a bevel-gear, $o$, on a short vertical shaft, $r$, also supported in the bearing-plates $f\ f$, and thus gives to the shaft $r$ a motion corresponding in speed to that of the shaft $e$. It will be perceived by reference to Fig. 1 that the two shafts $e\ r$ are not perpendicular to the line of the finger-bar, but stand inclined or oblique to that line. These shafts $e\ r$ have upon their upper ends, respectively, the cranks $s\ t$, of unequal lengths, that $s$ being much longer than the one $t$. The rake stale or handle G at its rear end is pivoted to a crank-pin, $u$, on the end of the short crank $t$, while the wrist or crank pin $v$ of the crank $s$ works in a slot or guide, $w$, in or on the rake-stale G, so that while the rear end of the rake-stale moves in or describes a circle in its movement its front, or the rake $x$, attached thereto, describes an irregular ellipse, which admits of the rake moving along the line of the finger-bar throughout nearly its entire length, or near enough thereto to sweep off all the cut grain that has fallen upon it, the object of the long crank $s$, slot or guide $w$, and the oblique line of the crank-shafts $e\ r$ all tending to give the rake this comparatively straight traverse across the front of the platform. Both of the crank-shafts and of the cranks have a positive motion given to them—one not being dependent for its motion upon the other one, as is often the case, and which makes the passive one but a sort of guide or connecting bar simply.

Having thus fully described the nature and object of my invention, what I claim is—

1. Operating a rake for a harvesting-machine by means of two rotating cranks of unequal lengths, and both driven by a positive motion, substantially as and for the purpose set forth.

2. The so combining with a rake shaft or handle of two rotating cranks of unequal lengths as that the said handle shall be united so as to move with the wrist-pin of the short crank, while the wrist-pin of the long crank traverses a slot or guide in or on said handle, thus causing one end of said handle to move in a true circle, while the other end describes an irregular ellipse, substantially as set forth.

3. In combination with a rake driven by two rotating cranks of unequal lengths having each a positive motion given to it, the setting of the crank-shafts in a line oblique to the line of the finger-bar or cutting-line of the machine, substantially as and for the purpose set forth.

PHILO SYLLA.

Witnesses:
JAMES COLEMAN,
WM. F. SYLLA.